United States Patent [19]

Flesburg

[11] 3,941,958

[45] Mar. 2, 1976

[54] FILTER BYPASS INDICATOR

[75] Inventor: Edward E. Flesburg, Peoria, Ill.

[73] Assignee: Caterpillar Tractor Co., Peoria, Ill.

[22] Filed: Aug. 9, 1974

[21] Appl. No.: 496,042

[52] U.S. Cl. ............ 200/82 R; 200/276; 340/239 F
[51] Int. Cl.² ........................................ H01H 35/38
[58] Field of Search ....... 55/274; 116/124 L, 117 R, 116/DIG. 25; 73/239, 249, 419; 340/239 F, 240; 200/81.9 R, 82 R, DIG. 50, 276, 239, 165, 288

[56] References Cited
UNITED STATES PATENTS

| | | | |
|---|---|---|---|
| 2,729,339 | 1/1956 | McCoy | 340/239 F |
| 3,261,953 | 7/1966 | Tilman et al. | 200/288 |
| 3,435,165 | 3/1969 | Lombard | 200/276 |
| 3,644,915 | 2/1972 | McBurnett | 340/239 F |
| 3,725,625 | 4/1973 | Pratt | 200/276 |

FOREIGN PATENTS OR APPLICATIONS 1,089,516  11/1967  United Kingdom ............ 340/239 F Primary Examiner—Gerald P. Tolin
Attorney, Agent, or Firm—Phillips, Moore, Weissenberger, Lempio & Strabala

[57] ABSTRACT

A fluid filter system includes housing means, including a housing body and a terminal fixed thereto, a filter element and a bypass associated with the housing body, a piston movable in first and second directions relative to the housing body and resilient means for urging the piston in the first direction. The piston is also movable in the second direction against the resilience of the resilient means. The piston is movable in the first direction to a position directing fluid through the filter element, and movable in the second direction upon buildup of fluid pressure thereon due to blockage of fluid flow in the filter element, against the resilience of the resilient means, to a position wherein the fluid flow may bypass the filter element. The improvement comprises a helical spring for maintaining an electrically conductive state between the piston and the terminal means upon an initial degree of movement of the piston in its second direction and for breaking the electrically conductive state between the piston and the terminal upon further movement of the piston in the second direction due to further fluid pressure buildup on the piston.

4 Claims, 4 Drawing Figures

FILTER BYPASS INDICATOR

BACKGROUND OF THE INVENTION

This invention relates to fluid systems for engines and transmissions, and more particularly, to means indicating fluid pressure in a fluid system.

In general, it is known to provide in an oil filter a bypass piston which is slidably disposed in the housing thereof. The piston is urged into a first position by a spring, and upon filter plugging, pressure buildup on such piston moves it against such spring to bring into effect the bypass system of the filter. Such a system may be used with advantage in combination with the system of U.S. Pat. No. 3,364,481, assigned to the assignee of this invention. When used in combination with such system, the piston is used to make contact with a terminal under the urging of the spring thereof, and such contact is utilized to provide that the indicator of U.S. Pat. No. 3,364,481 shows a green color. Ideally, upon blockage of the filter element, the piston moves away from such contact, to indicate a red color on the indicator. However, it has been found that pressure pulsations are imposed on the piston due to fluctuations, created by the gear pump of the oil system, causing the indicator to turn red even though the filter element is not plugged or blocked.

Of more general interest in this area is U.S. Pat. No. 3,611,337, also assigned to the assignee of this invention.

SUMMARY OF THE INVENTION

It is accordingly an object of this invention to provide apparatus for indicating blockage or plugging of a filter element which is part of a lubricating system.

It is a further object of this invention to provide apparatus which, while fulfilling the above object, provides accurate indication of the filter condition which is not affected by pressure pulsations due to variation in the speed of the gear pump of the system.

It is a still further object of this invention to provide apparatus which, while fulfilling the above objects, is extremely simple in design and effective in operation.

Broadly stated, the invention is in combination with fluid filter means comprising housing means having terminal means associated therewith, and a filter element, and bypass means associated with said housing means and comprising a piston movable in first and second directions relative to the housing means. Resilient means are included for resiliently urging the piston in the first direction, the piston being movable in the second direction against the resilience of the resilient means. The piston is movable in the first direction to a position directing fluid through the filter element, and is movable in the second direction upon buildup of fluid pressure thereon due to blocking of fluid flow in the filter element, against the resilience of the resilient means, to a position wherein a fluid flow may bypass the filter element. In combination with such structure, the improvement comprises means for maintaining an electrically conductive state between the piston and the terminal means upon an initial degree of movement of the piston in its second direction against the resilience of the resilient means due to a degree of fluid pressure buildup on the piston, and for breaking the electrically conductive state between the piston and the terminal means upon further movement of the piston in the second direction, due to further fluid pressure buildup on the piston.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
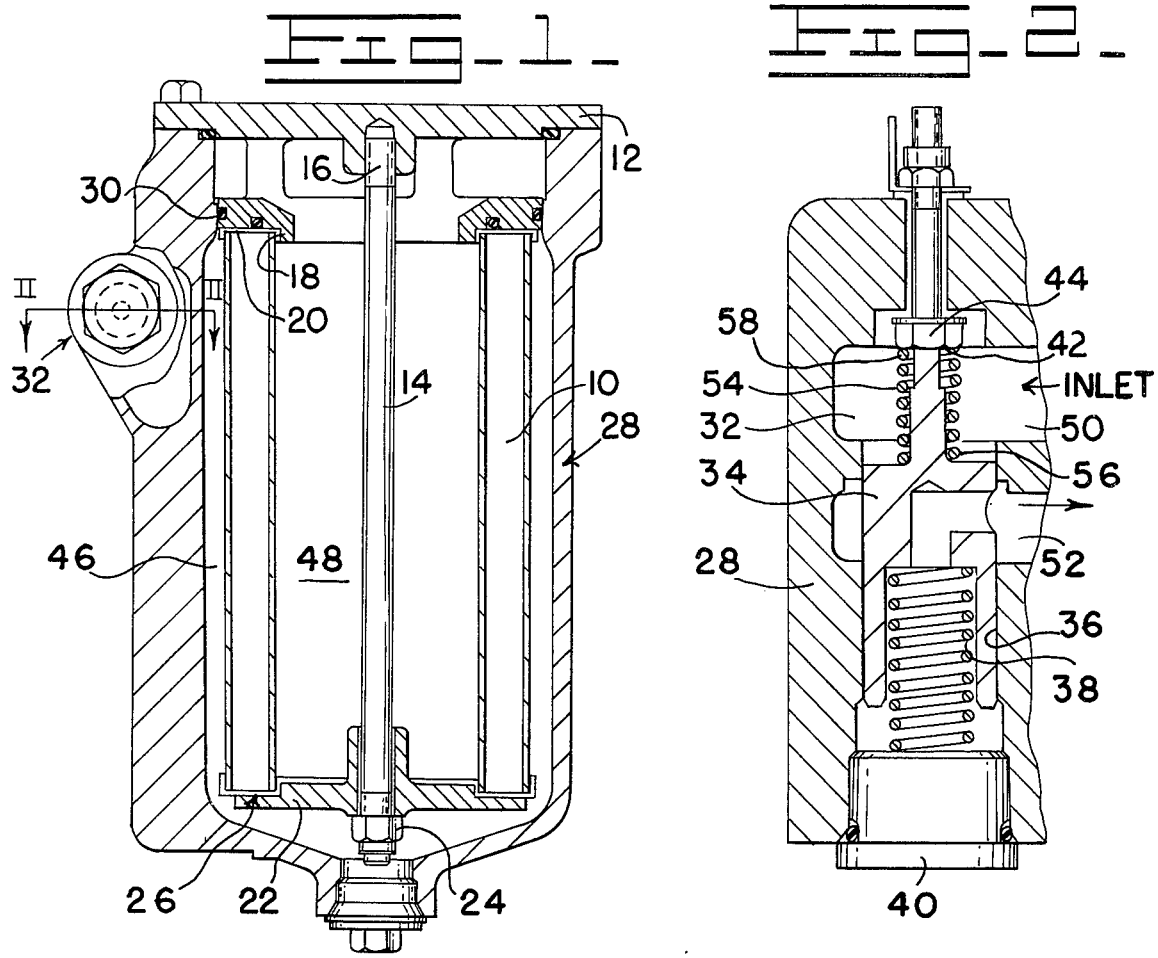
FIG. 1 is a sectional view of a fluid filter incorporating the invention.

Referring to FIG. 1, a filter element 10 is assembled against a cover adapter 12. An elongated rod 14 threaded at 16 is screwed into the adapter 12 to be secured thereto. The filter element 10 is located about diameter 18 and against face 20 of adapter 12 and is clamped to the adapter 12 by plate means 22 disposed about rod 14 and nut 24 which threads onto the end of the rod 14. The entire assembly 26 made up of filter element 10, adapter 12, rod 14, plate means 22, and nut 24 is placed into a housing 28, and the adapter 12 is bolted to the housing. Seal means are provided at 30.

Bypass means 32 are associated with the housing 28, and include a piston 34 movable in first and second opposite directions relative to such housing within a bore 36 defined by the housing 28. A spring 38 is disposed between a plug 40 which is part of the housing 28 and the piston 34, to urge the piston 34 in its first direction, bringing the extending face 42 of the piston 34 into contact with a terminal 44 which is also part of the housing 28. It will be seen that the piston 34 is movable in the second direction against the resilience of the spring 38.

Under normal conditions, with the filter relatively unblocked, fluid normally flows from the inlet chamber 46 through the filter element 10 inwardly thereof to an outlet chamber 48, from which fluid is allowed to leave the housing 28. The seal means 30 are appropriately placed so that fluid flow must pass from inlet chamber 46 through the filter element 10 and into outlet chamber 48. Inlet 50 communicates with the inlet chamber 46, so that the piston 34 is subjected to fluid pressure which may exist in such inlet chamber 46. The spring 38 normally urges the piston 34 in the first direction to a position wherein fluid is directed through such filter element 10, the bypass system 32 not being operable in such state. Upon buildup of fluid pressure on the piston 34, due to fluid pressure buildup in the chamber 46, the piston 34 is moved in the second direction against the force of the spring 38. (See FIG. 3) Upon a substantial degree of blockage in the filter element 10, the piston 34 will be subjected to relatively great pressure buildup thereon, and will move further in the second direction so that fluid is allowed to flow from inlet 50 past the piston 34 and through an outlet 52, which communicates with the outlet chamber 48, thereby allowing the fluid to bypass the plugged or clogged filter element 10.

The apparatus is set up so that when an electrically conductive state is maintained between the piston 34 and the terminal 44, the indicator of the type disclosed in U.S. Pat. No. 3,364,481 shows green, and when the electrical circuit is broken between such piston 34 and terminal 44, the indicator will show red. In prior usage, the helical spring 38 has been depended upon to maintain proper contact between the face 42 of the piston 34 and the terminal 44 when appropriate. It has been found, however, that when depending solely on the helical spring 38, a relatively small initial degree of movement of the piston 34 in its second direction against the resilience of the spring 38 due to a degree of fluid pressure buildup on the piston 34 provides a gap between the face 42 of the piston 34 and the terminal 44, which under normal circumstances would then indicate a red condition. This may occur even with a low pressure differential across the filter element 10, wherein the filter element 10 is not in a clogged state.

Figure 3:
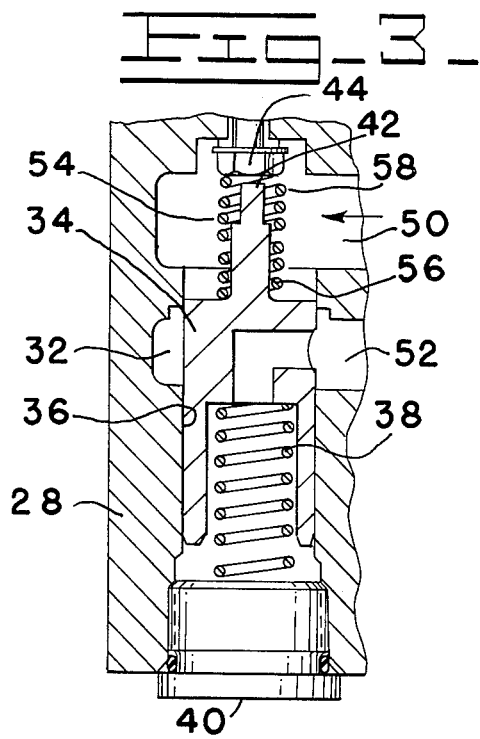
FIG. 3 is a view similar to that shown in FIG. 2, but with the piston moved to a small extent away from contact with the terminal means.
Figure 2:
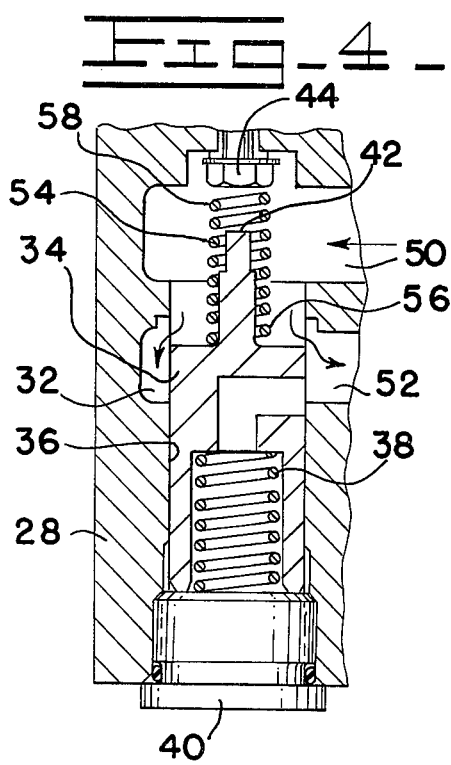
FIG. 2 is a sectional view taken along the line II—II of FIG. 1, with the piston in contact with the terminal means of the apparatus.

In order to provide an accurate red-green reading as to the true state of the filter element 10, a helical resilient spring 54 is mounted on the piston 34 and has its base 56 secured to the piston 34, and in its fully extended state has its extended end 58 extending past the face 42 of the piston 34. The spring 54 is positioned so that it may contact the terminal 44 upon an initial small degree of movement of the piston 34 in its second direction against the resilience of the spring 38 due to a relatively small degree of fluid pressure buildup on the piston 34, as shown in FIG. 3. In such state, the filter element 10 is still in its unclogged state, and the bypass system 32 of the apparatus is not in operation. The maintainence of such electrically conductive state between the piston 34 and the terminal 44 provides a continued green indication, indicating that the filter element 10 is in such properly operable state. Even during pressure pulsations in the system which move the piston 34 to an extent in its first and second directions, the spring 54 acts to maintain such electrically conductive state between the piston 34 and the terminal 44.

Figure 4:
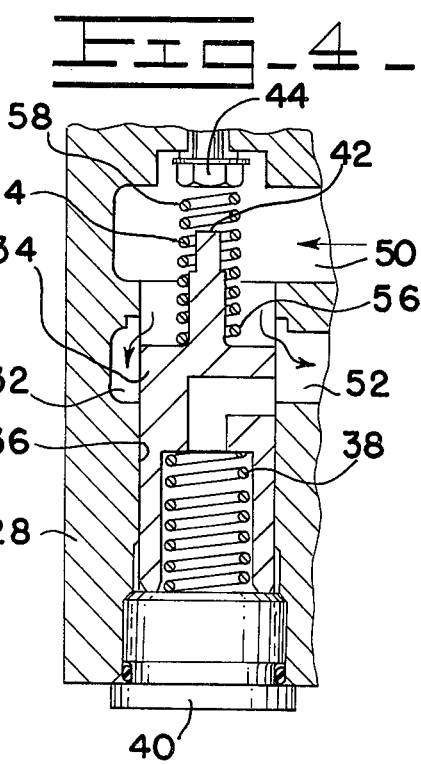
FIG. 4 is a view similar to that shown in FIGS. 2 and 3 but showing the piston substantially removed from contact with the terminal means.

Upon sufficient plugging or blockage of the filter element 10, the piston 34 will be subjected to a relatively high pressure tending to move it in its second direction, and the piston 34 will move to a point where the inlet 50 communicates with the outlet 52 as shown in FIG. 4, so that fluid flow bypasses the filter element 10. As the piston 34 moves in its second direction, the spring 54 extends more and more, until (since the base 56 of the spring 54 is secured to the piston 34) with the spring 54 obtaining its free length, the extended end 58 of the spring 54 is removed from the terminal 44, breaking the electrically conductive state between the piston 34 and the terminal 44. Upon such breaking of the electrically conductive state, the indicator turns red.

The additional spring 54 thus insures that the red-green indicator provides an accurate indication of the state of the filter element 10 and the bypass circuit 32. False readings of the red-green indicator will not occur due to pressure pulsations created by the gear pump of the system.

What is claimed is:

1. The combination comprising housing means having terminal means associated therewith and a filter element, and bypass means associated with said housing means and comprising a piston movable in first and second directions relative to said housing means within a bore defined by the housing means, and resilient means for resiliently urging the piston in the first direction, said piston being movable in said second direction against the resilience of the resilient means, the piston being movable in said first direction to a position directing fluid through said filter element, and movable in said second direction upon buildup of fluid pressure thereon due to blocking of fluid flow in the filter element, against the resilience of the resilient means, to a position wherein the fluid flow may bypass the filter element, and means for maintaining an electrically conductive state between the piston and the terminal means upon an initial degree of movement of the piston in its second direction against the resilience of the resilient means due to a degree of fluid pressure buildup on said piston, and for breaking said electrically conductive state between said piston and said terminal means upon further movement of the piston in the second direction, due to further fluid pressure buildup on said piston.

2. The invention of claim 1 wherein the means for maintaining said electrically conductive state between the piston and the terminal means comprise additional resilient means having a conductivity rate sufficient to maintain said electrically conductive state when in contact with both the terminal means and piston.

3. The invention of claim 2 wherein the additional resilient means comprise a helical spring mounted on the piston and which may contact said terminal means.

4. The invention of claim 3 wherein a portion of the helical spring is secured to the piston.

* * * * *